(12) United States Patent
Cisneros et al.

(10) Patent No.: US 10,282,549 B2
(45) Date of Patent: May 7, 2019

(54) MODIFYING SERVICE OPERATING SYSTEM OF BASEBOARD MANAGEMENT CONTROLLER

(71) Applicant: HEWLETT PACKARD ENTERPRISE DEVELOPMENT LP, Houston, TX (US)

(72) Inventors: Jorge Daniel Cisneros, Houston, TX (US); Lee A. Preimesberger, Houston, TX (US); Sean Pope, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 88 days.

(21) Appl. No.: 15/451,830

(22) Filed: Mar. 7, 2017

(65) Prior Publication Data
US 2018/0260568 A1    Sep. 13, 2018

(51) Int. Cl.
| | | |
|---|---|---|
| G06F 9/00 | (2006.01) | |
| G06F 9/24 | (2006.01) | |
| G06F 15/177 | (2006.01) | |
| G06F 21/57 | (2013.01) | |
| H04L 9/32 | (2006.01) | |
| G06F 8/65 | (2018.01) | |
| H04L 9/08 | (2006.01) | |

(52) U.S. Cl.
CPC .............. *G06F 21/575* (2013.01); *G06F 8/65* (2013.01); *H04L 9/0891* (2013.01); *H04L 9/3247* (2013.01); *G06F 2221/034* (2013.01)

(58) Field of Classification Search
CPC ...................................................... G06F 9/44
See application file for complete search history.

(56) References Cited

U.S. PATENT DOCUMENTS

| | | | |
|---|---|---|---|
| 8,032,745 B2 | 10/2011 | Bandholz et al. | |
| 9,384,367 B2 | 7/2016 | Swanson et al. | |
| 2013/0111212 A1 | 5/2013 | Baltes et al. | |
| 2015/0089209 A1* | 3/2015 | Jacobs | G06F 21/575 |
| | | | 713/1 |
| 2015/0089221 A1 | 3/2015 | Taylor et al. | |
| 2016/0182469 A1 | 6/2016 | Ahmed et al. | |

(Continued)

OTHER PUBLICATIONS

Michael Wei et al., "Reliably Erasing Data From Flash-Based Solid State Drives," Dec. 17, 2016, pp. 1-13, University of California, San Diego, CA, USA, Available at: <static.usenix.org/legacy/events/fast11/tech/full_papers/Wei.pdf>.

*Primary Examiner* — Mohammed H Rehman
(74) *Attorney, Agent, or Firm* — Hewlett Packard Enterprise Patent Department (57) ABSTRACT

In an example, a device comprises a baseboard management controller (BMC). The BMC comprises non-volatile storage storing a service operating system (OS). The BMC also comprises a processor. The processor may: receive, by a baseboard management controller (BMC), a request to modify the non-volatile storage, wherein the request comprises a signature, determine, by the BMC, based on a received signature, and a key for modifying the non-volatile storage, whether the request to modify the non-volatile storage is properly signed, and responsive to determining the request to modify the non-volatile storage is properly signed: allow modification of the non-volatile storage.

15 Claims, 7 Drawing Sheets

(56) References Cited

U.S. PATENT DOCUMENTS

| | | | |
|---|---|---|---|
| 2016/0364297 A1* | 12/2016 | Lo | G06F 11/1417 |
| 2017/0083457 A1* | 3/2017 | Khemani | G06F 12/1408 |
| 2017/0147827 A1* | 5/2017 | Bowers | G06F 21/577 |
| 2017/0168851 A1* | 6/2017 | Lin | G06F 8/654 |
| 2018/0091315 A1* | 3/2018 | Singhal | H04L 9/3268 |
| 2018/0165455 A1* | 6/2018 | Liguori | G06F 21/575 |

* cited by examiner

MODIFYING SERVICE OPERATING SYSTEM OF BASEBOARD MANAGEMENT CONTROLLER

BACKGROUND

A computing device may comprise a baseboard management controller (BMC). The BMC may provide management functionality for the computing device even if an operating system is not installed or is non-functional.

BRIEF DESCRIPTION OF THE DRAWINGS

The following detailed description references the drawings, wherein.

DETAILED DESCRIPTION

Baseboard management controller provide so-called "lights-out" functionality for computing devices. The lights out functionality may allow a user, such as a systems administrator to perform management operations on the computing device even if an operating system is not installed or not functional on the computing device. As examples, the BMC may so-called provide management and so-called "out-of-band" services, such as remote console access, remote reboot and power functionality, access to system logs, and the like. As used herein, a BMC has management capabilities for sub-systems of a computing device, and is separate from a processor that executes a main operating system of a computing device. The BMC may comprise an interface, such as a network interface, and/or serial interface that an administrator can use to remotely communicate with the BMC.

The BMC may also allow firmware updates for devices of the computing device, such as storage controllers or other hardware of the computing device. The BMC may execute an embedded operating system, referred to herein as a "service operating system," (service OS) to configure hardware, such as storage controllers and the like, before the main operating system executes, and is separate from the main operating system.

The BMC may store software, such as the service OS on non-volatile storage that is part of the BMC. However, because the non-volatile storage is re-writable, and because the BMC is remotely accessible, there may be security concerns related to storing software, such as the service OS, firmware, or any other executable code, on the BMC non-volatile storage. One risk is that a remote attacker could obtain access to the non-volatile storage from the BMC, and surreptitiously modify the service OS or other instructions that the BMC executes such that the modified service OS gives a remote attacker access to data stored on the computing device.

The techniques of this disclosure describe techniques for securing BMC non-volatile storage. More particularly, the techniques of this disclosure propose signing the non-volatile storage using public key encryption. In order to modify the contents of the non-volatile storage, a user has to supply the corresponding private key to modify the non-volatile storage. If the user supplies the correct key to the BMC, the BMC generates a new, temporary public key and private key to the user. The user may then modify the contents of the non-volatile storage with the private key. Thus, the techniques of this disclosure enable a user to securely modify (i.e. upgrade, install, add, remove, and/or replace) the contents of BMC non-volatile storage and to prohibit unauthorized access to the BMC non-volatile storage.

Figure 1:
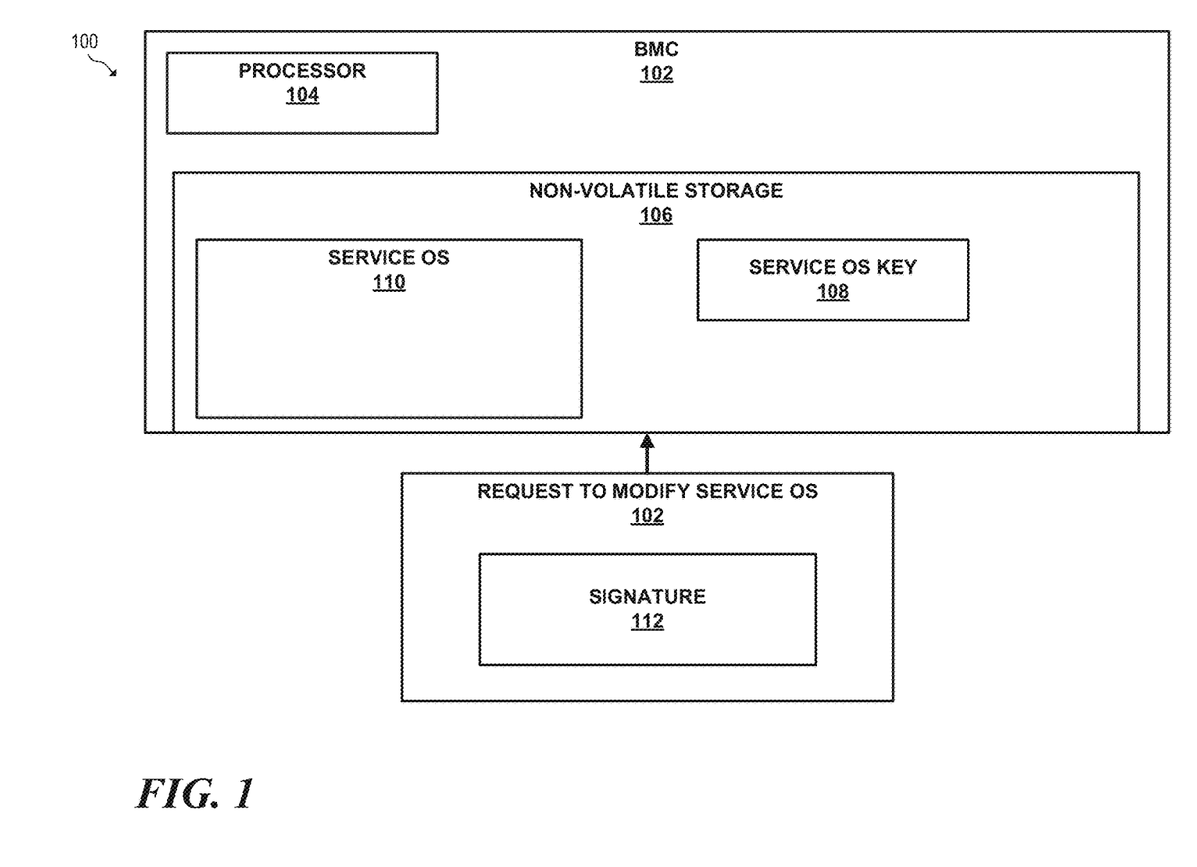
FIG. 1 is a block diagram of an example computing system comprising a baseboard management controller.

FIG. 1 is a block diagram of an example computing system 100 of a baseboard management controller (BMC) to verify non-volatile storage of the BMC. System 100 comprises a BMC 102. BMC 102 may comprise a processor 104. Processor 104 may comprise a field programmable gate array (FPGA), application-specific integrated circuit (ASIC), microcontroller, central processing unit (CPU), logic, or any combination thereof.

Processor 104 may be coupled to non-volatile storage 106. Non-volatile storage 106 may comprise any non-volatile storage medium, such as NAND flash, memristors, phase change memory, resistive random access memory (ReRAM), or the like.

BMC 102 may provide so-called lights-out functionality for a computing device. Lights out functionality allows a user connected to the BMC (typically using a network connection) to perform management operations on the computing device. Such management operations may comprise: power cycling the computing device, mounting media, obtaining log information, and the like.

BMC 102 may comprise part of a motherboard of a computing device. At boot-up, processor 102 may execute a service OS, such as service OS 110. Service OS 110 may comprise an embedded version of an OS executed by processor 104 before a CPU of the computing device executes a main operating system. Service OS 110 may load drivers for hardware devices of the computing device. For example, service OS 110 may load drivers for a host bus adapter (HBA), and may allow settings of the HBA to be configured, e.g. by a user or script.

One issue with BMCs is security. Because BMCs have the capability to interact with hardware, there is a danger that if malicious code were installed, that an intruder could gain access to data stored on the computing device. Some users of the computing device may wish to replace the manufacture-installed service OS with their custom software and may also desire to ensure that the custom version of the service OS is not tampered with. The techniques of this disclosure describe techniques for verifying that a request to modify a service OS is valid. This disclosure also describes techniques for verifying that a service OS has not been tampered with.

In the example of FIG. 1, BMC 102 receives a request (102) to modify a service OS. BMC 102 may receive the request, e.g. via a network or serial interface (illustrated in greater detail with respect to FIG. 2). In various examples, BMC 102 may receive the request via a REST API (application programming interface) or another API exposed by BMC 102. Request 102 indicates that a user wishes to change the contents of service OS 110. In various examples, request 102 may comprise data that is to be stored on non-volatile storage 106, e.g. a new version of service OS 110.

For the security reasons described above, BMC 102 does not automatically accept requests to write new data to non-volatile storage 106. Rather, BMC 102 ensures that any received message is encrypted or signed with an authorized key, e.g. a private key if using public key encryption, a secret symmetric if using symmetric encryption, before allowing modification of service OS 110. In some examples, BMC 102 may use a combination of public key encryption and symmetric key encryption for different functionality, as described herein.

To modify the service OS, in some examples, BMC 102 may copy new service OS data to an unused portion of non-volatile storage 106. In some examples, BMC 102 may replace a region of non-volatile storage 106 storing an existing service OS with a new version of service OS 110. Responsive to modifying service OS 110, BMC 102 may update a bootloader to point to an address associated with the new or modified service OS 110.

In some examples, processor 104 may be configured to store a root key, e.g, a root private key or a root secret key. If BMC 102 receives a message, and successfully decrypts the message using the secret private key, e.g. using a symmetric key encryption algorithm, BMC 102 determines that the message has been authorized by the root authority (e.g. the manufacturer or the organization to which the root key has been issued). In other examples, e.g. when using public key encryption, BMC 102 may store a private key and may verify that a signature of a received request was generated using a public key corresponding to the private key, e.g. using a digital signature algorithm. In some examples, the public key may be along with the signature.

In other examples, BMC 102 may store a public key of a root certificate. The root certificate authority may sign the public keys of other certificate authorities to authorize messages signed by the other certificate authorities. As an example, the manufacturer of BMC 102 may comprise a root certificate authority. The root certificate authority may generate a public key and a private key as part of generating a root certificate. The manufacturer may store the public key of the root certificate in processor 104 or other secure storage of BMC 102.

In some examples, BMC 102 may receive a request to add an additional key to BMC 102. The additional key may grant a user with the additional a specific set of permissions for interacting with BMC 102. For example, the additional key may grant a user permission to modify the contents of service OS 110, e.g. service OS key 108. In the example where the request to add the additional key is sent using symmetric key encryption, a secret key stored on BMC 102 is used to decrypt and verify the authenticity of the request. If processor 104 verifies the message is authentic, processor 104 may generate and/or store a new secret key for modifying service OS 110, e.g. service OS key 108.

Responsive to receiving a request to modify the non-volatile storage that is encrypted with service OS key 108, e.g. request 102, BMC 102 decrypts the message using service OS key 108. BMC 102 may determine that a message is valid and has been decrypted successfully, in some examples, based on the presence of a magic number in the request. A magic number may comprise a particular number that the BMC expects to be present in a request, such as a global identifier. In some examples, BMC 102 may determine that a request has been successfully decrypted if a message parser determines that the decrypted message is well-formed, i.e. does not cause any message parsing errors.

In various examples, the request to non-volatile storage 102 may be generated using a digital signature algorithm. The digital signature algorithm generates a signature based on a private key, a public key (i.e. public key cryptography), and a hash function. The signature may be generated by inputting data from the message into a hash function to output a hash value, and then encrypting the hash value using a signer's private key. A receiver may verify that the message was properly signed by applying the same has function to the message (e.g. request 102), and determining whether the signature, when decrypted using the signer's public key, is equal to the hash value generated from the message.

A digital signature ensures that the sender generated the message. A digital signature does not, however, ensure that the sender was authorized to send the message. In order to ensure that the sender of a request is authorized to perform a requested action on BMC 102, the sender may sign the sender's public key with the private key of a root authority, i.e. an entity authorized to grant permission to perform actions on BMC 102. The authorization of a signing of a public key with a private key of an entity (e.g. a root authority) by an authorizing entity is referred to as a "chain of trust." In some examples, requests may be signed with digital certificates comprising signatures rather than just signatures. Additional details relating to signing request will now be described in greater detail.

BMC 102 may receive a request to modify service OS 110 that comprises a signature 112. Signature 112 is generated using the private key and the public key for modifying service OS 110. If BMC 102 does not store service OS key 108, BMC 102 determines whether the public key of request 102 was signed by the private key of the root authority. If the public key associated with signature 112 is properly signed, or if BMC 102 stores a copy of the public key, processor 104 determines whether signature 112 was generated with the private key corresponding to service OS key 108. Responsive to determining that the signature 112 was generated with the private key corresponding to the public key used to generate signature 112, processor 104 allows modification of service OS 110.

In some examples, the root authority may authorize requests from another entity by signing the public key of that entity with the root authority's private key. As an example, the entity may generate a request, e.g. request 102. The entity may sign request 102 with the entity's private key to produce signature 112. Request 102 may further comprise the entity's public key, which is signed by the root authority.

In this example, to verify that the request 102 generated by the entity is authorized by the root authority, processor 104 determines whether the entity's public key has been signed with the root authority's private key. If the entity's public has been signed by the root authority, processor 104 determines whether request 102 has been signed with the entity's public key, based on a public key in request 102 or stored in BMC 102, using a signature algorithm as described above. If request 102 is both properly signed with the entity's private key, and the entity's public key has been signed by the root authority, processor 104 performs the requested action.

In some examples, the root authority or an entity authorized by the root authority may generate and sign keys that are associated with performing a specific function. As one example, an entity may generate public and private keys for modifying non-volatile storage 106. The entity may sign the non-volatile storage modification public key with the entity's private key. BMC 102 may allow a requestor to modify non-volatile storage 106 in response to receiving a request signed with the non-volatile storage modification key. The entity may generate public and private keys for performing other functions, such as changing a bootloader, modifying service OS 110, and verifying data stored on non-volatile storage 106, as some non-limiting examples.

In the example of FIG. 1, BMC 102 receives a request to modify non-volatile storage 102. Request 102 comprises a signature 112. Signature 112 is signed with a private key, which is not transmitted to BMC 102. In some examples BMC 102 may store the public key corresponding to request 102 in non-volatile storage 106. In some examples, request 102 may comprise the public key. Responsive to receiving the request, processor 104 verifies whether request 102 is properly signed based on signature 112 and the public key. If request 102 is properly signed, processor 104 allows modification of service OS 110.

Figure 2:
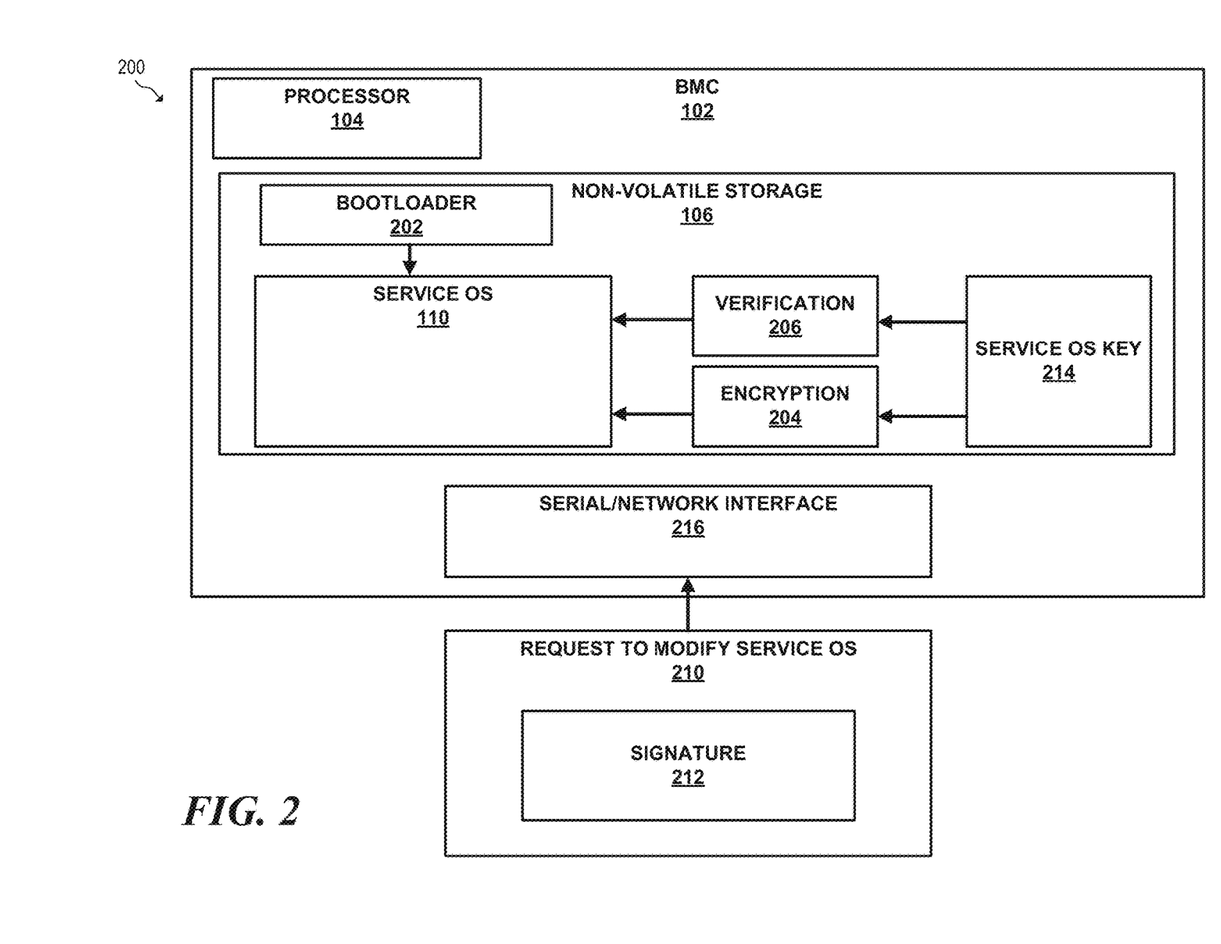
FIG. 2 is another example computing system comprising a baseboard management controller.

FIG. 2 is a block diagram of another example computing system 200 comprising baseboard management controller. System 200 comprises BMC 102, which may be similar to BMC 102 of FIG. 1. BMC 102 may comprise a processor 104, and non-volatile storage 106. BMC 102 may also comprise volatile memory, such as random access memory (RAM) (not pictured).

Processor 104 may be coupled to non-volatile storage 106. Non-volatile storage 106 store comprise service OS 110. At boot-time, processor 104 may read a bootloader 202, which helps to load, and refers to the location of the currently-installed service OS 110. Securing bootloader 202 is also important for the security of systems with BMCs because changing the address to which bootloader 202 refers could allow an attacker to execute a different service OS, and therefore execute arbitrary code.

In the example of FIG. 2, BMC 102 receives a request to modify a service OS 210. BMC 102 may receive request 210 via a network or serial interface 216, e.g. using a REST API. The request may indicate that a user wishes to alter the contents of service OS 110. Request 210 comprises a signature 212, which processor 104 checks to verify whether the request is authorized.

As described above, processor 104 may verify the identity of the sender of request 210 based on a public key associated with the signature. In some examples, request 210 may comprise the public key for modifying service OS 110. In the example of FIG. 2, non-volatile storage 106 stores service OS Key 214, and processor 104 may perform verification 206 to determine whether signature 212 was properly generated based on the stored OS key 214.

In some other examples, request 210 may not comprise a signature, and processor 104 may perform verification 206 of request 210 using symmetric key encryption based on service OS key 214, wherein service OS key 214 a secret key used for decrypting request 210.

If processor 104 verifies that request 210 is properly signed, or that service, processor 104 allows modification of service OS 110. In some examples, responsive to allowing modification of service OS 210, processor 104 may generate a new public key and a new private key for modifying service OS 110. If BMC 102 is using symmetric encryption, BMC 102 may store the secret key for symmetric encryption, e.g. in non-volatile storage 106. In other examples, e.g. where BMC 102 uses public key used, processor 104 may make the new private key for modifying service 110 available, e.g. via the REST API.

In various examples, processor 104 may generate a signature for bootloader 202 using a digital signature as described above. The signature may be based on a hash of the contents of bootloader 202. Processor 104 determines whether the signature of bootloader 202 is valid by determining whether the public key was used to generate the signature. In other examples, bootloader 202 may be encrypted using symmetric key encryption. BMC may decrypt bootloader 202 using a secret key.

In various examples, BMC 102 may receive a request to modify bootloader 202. Processor 104 may determine whether the request is signed or encrypted using a key for modifying bootloader 202. If the request is properly signed, processor 104 may allow modification of bootloader 202.

In some examples, processor 104 or a controller associated with non-volatile storage 106 may encrypt the content of non-volatile storage 106, e.g. bootloader 202, and/or service OS 110. In some examples, processor 104 may encrypt each block of service OS 110 with a secret key, e.g. using a symmetric encryption algorithm. In other examples, processor 104 may generate a checksum to verify each block based on a key for verifying data of the service OS. In yet other examples, processor 104 may generate a single checksum e.g. by determining a checksum based on the secret key for each block, and feeding the output from one block into the calculation of the checksum of the next block, similar to hash chaining or cipher block chaining.

In various examples, e.g. when BMC 102 receives and verifies a request to modify service OS 110, processor 104 may generate a new secret key for encrypting or verifying service OS 110. In these examples, processor 104 may re-encrypt the service OS or non-volatile storage 106 with the newly-generated key as described in this disclosure.

During the boot process, processor 104 may verify and/or decrypt bootloader 202, and may then verify service OS 110. Processor 104 may begin execution service OS 110 responsive to verifying service OS 110. However, as described herein, data of non-volatile storage 106, such as a block or blocks of service OS 110 may be encrypted. Responsive to verifying service OS 110, processor 104 may pass service OS key 210 to service OS 110 so that service OS 110 can decrypt encrypted data stored on non-volatile storage 106, e.g. data accessed by service OS 110.

Figure 3:
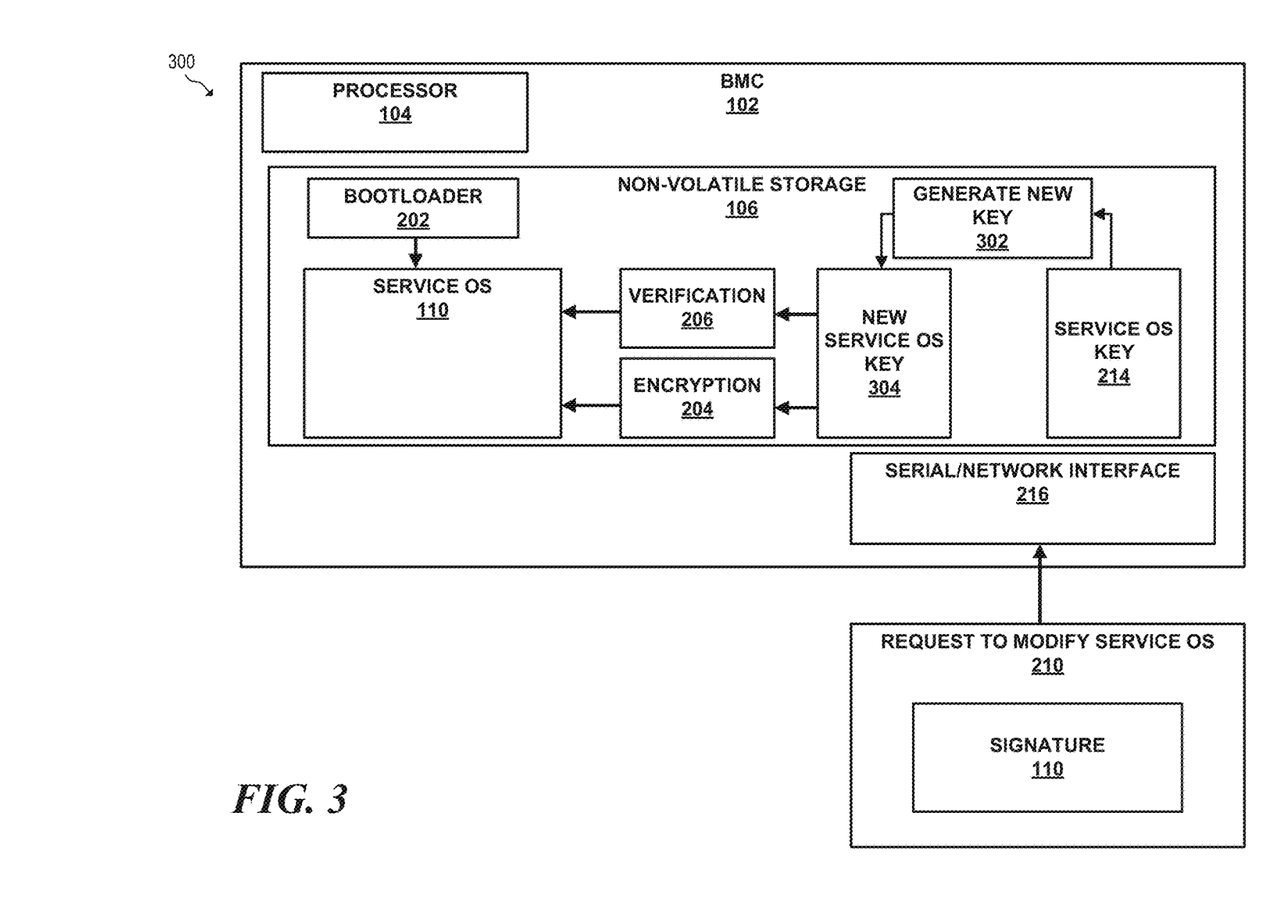
FIG. 3 is another example computing system comprising a baseboard management controller.

FIG. 3 is a block diagram of another example computing system 300 comprising baseboard management controller. System 300 comprises BMC 102, which may be similar to BMC 102 of FIG. 1. BMC 102 may comprise a processor 104, and non-volatile storage 106. BMC 102 may also comprise volatile memory, such as random access memory (RAM) (not pictured).

In the example of FIG. 3, BMC 102 receives a request to modify service OS 210. Processor 104 may verify request 210 based on a signature 112 and a public key comprising service OS key 214 in some examples. In other examples, processor 104 may verify request 210 using symmetric key encryption using service OS key 214 as a secret key.

Responsive to verifying request 210 to modify service OS 110, processor 104 may generate a new key or keys. In some examples, processor 104 may generate a new key service OS key 302. In the example of FIG. 3, new service OS key may comprise at least one of a new public key and a new private key (e.g. if using public key encryption) for modifying service OS 110. In other examples, processor 104 may generate a single secret key for modifying service OS 110. In some examples, new service OS key 304 may comprise the secret key for modifying service OS 110. In some examples, processor 104 may store new service OS key 304, e.g. in non-volatile storage 106.

In the example of FIG. 1, BMC 102 receives a request (102) to modify non-volatile storage. BMC 102 may receive the request, e.g. via a network or serial interface. In various examples, BMC 102 may receive the request via a REST API or another API exposed by BMC 102. Request 102 indicates that a user wishes to change the contents of service OS 110. In various examples, request 102 may comprise data that is to be stored on non-volatile storage 106, e.g. a new version of service OS 110.

For the security reasons described above, BMC 102 does not automatically accept requests to write new data to non-volatile storage 106. Rather, BMC 102 ensures that any received message is signed with an authorized private key before allowing modification of non-volatile storage 106.

In some examples, processor 104 may be configured to store a root private key. If BMC 102 receives a message, and successfully decrypts the private key, e.g. using a symmetric key encryption algorithm, BMC 102 determines that the message has been authorized by the root authority (e.g. the manufacturer or the organization to which the root key has been issued).

Figure 4:
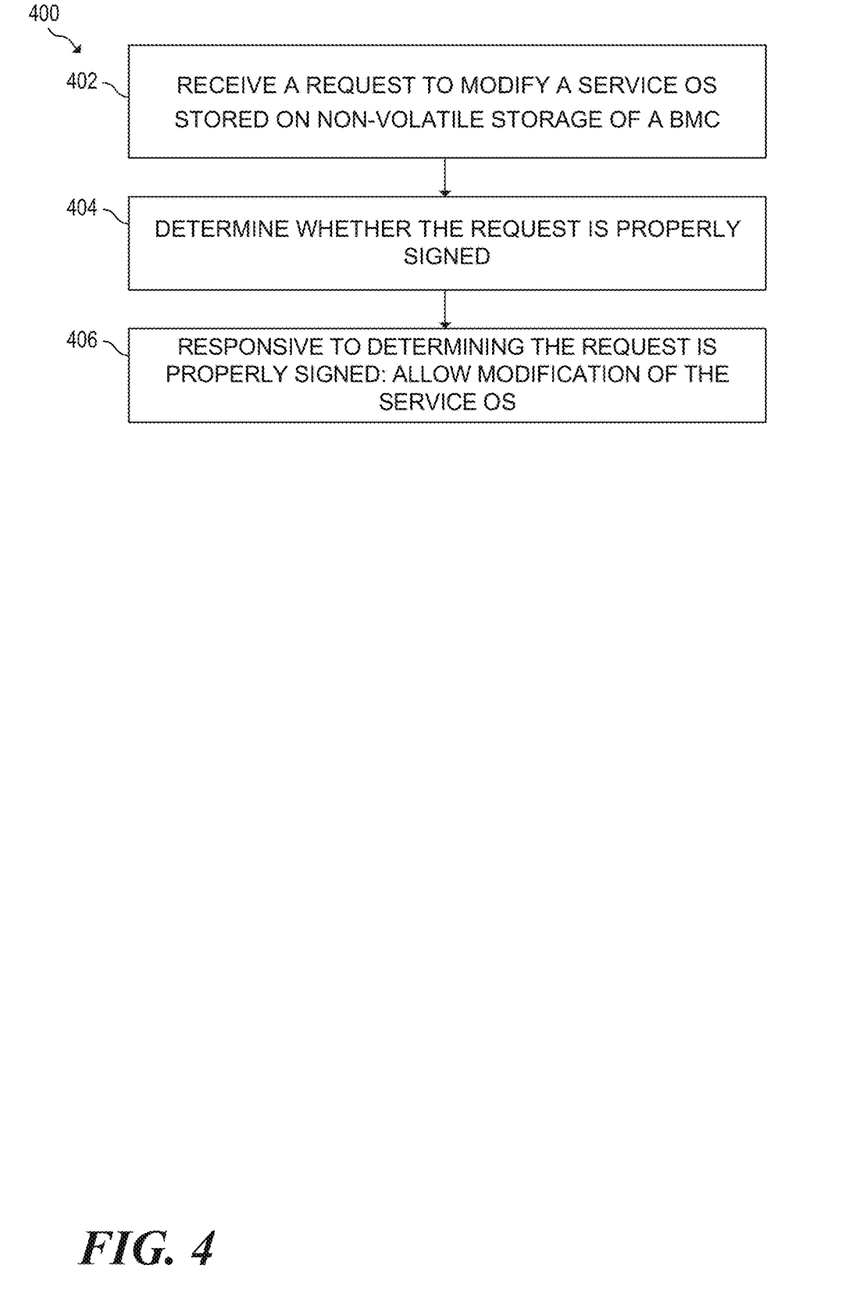
FIG. 4 is a flowchart of an example method for modifying a service OS of a baseboard management controller.

FIG. 4 is a flowchart of another example method for modifying a service OS of a baseboard management controller. Method 400 may be described below as being executed or performed by a system or device, for example, computing system 100 of FIG. 1, computing system 200 of FIG. 2, or system 300 (FIG. 3). Other suitable systems and/or computing devices may be used as well. Method 400 may be implemented in the form of executable instructions stored on at least one machine-readable storage medium of the system and executed by at least one processor of the system.

Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat. A processor, such as processor 104, described above, may performed the method steps described herein.

Method 400 may start at block 402. Block 402 may comprise receiving, by a baseboard management controller (BMC), a request to modify a service OS, wherein the service OS is stored on non-volatile storage coupled to the BMC, and wherein the request comprises a signature. At block 404, the method may comprise determining, by the BMC, based on the received signature and a key for modifying the service OS, whether the request to modify the service OS is properly signed. At block 406, the method may comprise: responsive to determining the request to modify the service OS is properly signed: allowing modification of the service OS.

Figure 5:
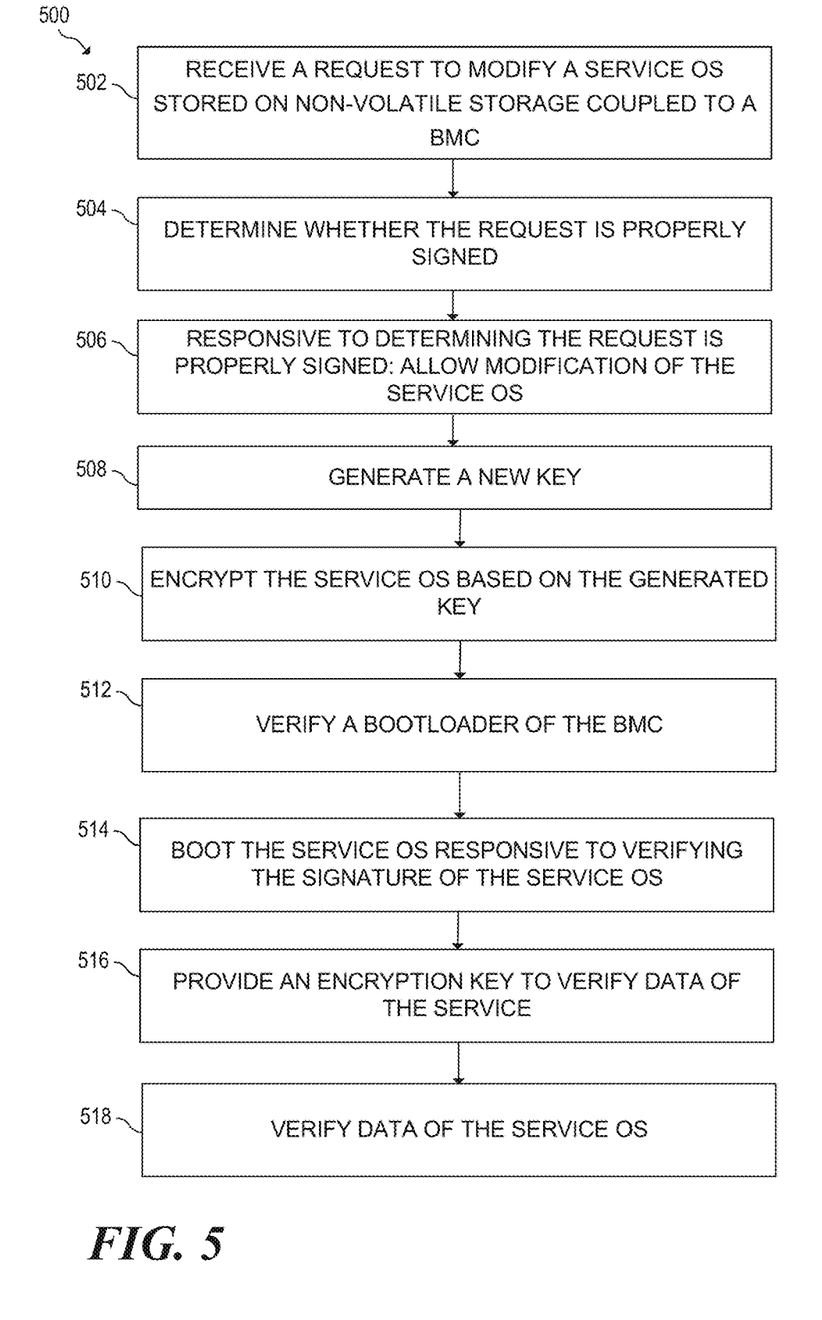
FIG. 5 is a flowchart of an example method for modifying a service OS of a baseboard management controller.

FIG. 5 is a flowchart of another example method for modifying a service OS of a baseboard management controller. Method 500 may be described below as being executed or performed by a system or device, for example, computing system 100 of FIG. 1, computing system 200 of FIG. 2, or system 300 (FIG. 3). Other suitable systems and/or computing devices may be used as well. Method 500 may be implemented in the form of executable instructions stored on at least one machine-readable storage medium of the system and executed by at least one processor of the system.

Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or less blocks than are shown in FIG. 5. In some examples, one or more of the blocks of method 500 may, at certain times, be ongoing and/or may repeat. A processor, such as processor 104, described above, may performed the method steps described herein.

Method 500 may start at block 502. Block 502 may comprise receiving, by a baseboard management controller (BMC), a request to modify a service OS stored on non-volatile storage that is coupled to the BMC, wherein the request comprises a signature. In some examples, the request may be received by at least one of a serial interface or a network interface of the BMC, wherein the at least one serial interface or network interface is coupled to a computing device separate from a computing device comprising the BMC. At block 504, the method may comprise determining, by the BMC, based on the received signature and a key for modifying the service OS, whether the request to modify the service OS is properly signed. At block 506, the method may comprise: responsive to determining the request to modify the service OS is properly signed: allowing modification of the service OS.

At block 508, the method may comprise generating, by the BMC, a new key for modifying the service OS. At block 510, the method may comprise encrypting, by the BMC, the service OS based on the generated key.

At block 512, the method may comprise verifying, by the BMC, a signature of a bootloader of the BMC before reading the service OS from the non-volatile storage. At block 514, the method may comprise booting, by the BMC, the service OS responsive to determining that the service OS is properly signed, and at block 516 the method may comprise providing, by the BMC and to the service OS, an encryption key to verify data of the service OS. At block 518, the method may comprise verifying, by the service OS, data of the non-volatile storage accessed by the service OS.

Figure 6:
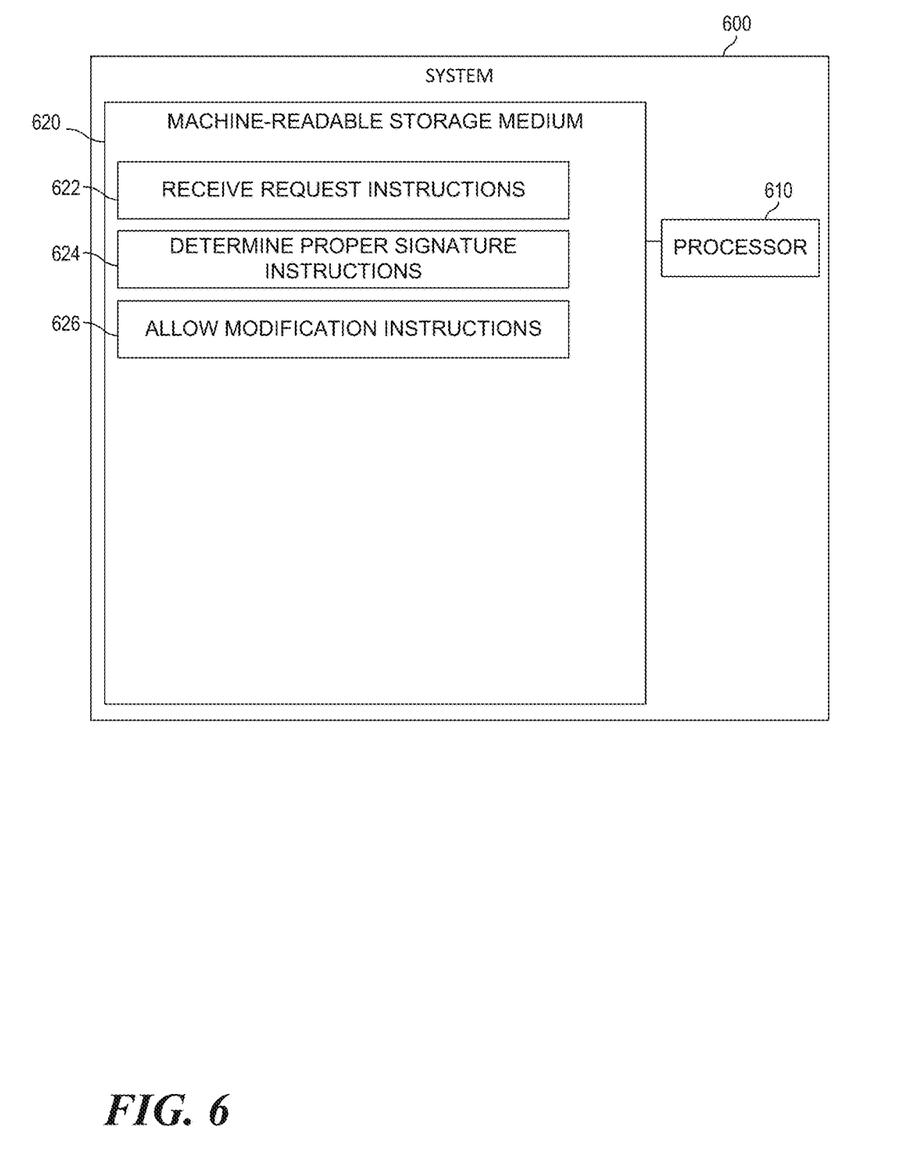
FIG. 6 is a block diagram of an example system for modifying a service OS of a baseboard management controller.

FIG. 6 is a block diagram of an example system for verifying a service OS of a baseboard management controller. System 600 may be similar to system 100 of FIG. 1, system 200 of FIG. 2, or system 300 of FIG. 3, for example. In the example of FIG. 6, system 600 includes a processor 610 and a machine-readable storage medium 620.

Storage medium 620 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular examples shown in FIG. 6, processor 610 may fetch, decode, and execute instructions 622, 624, 626 to modify non-volatile storage of a BMC. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. In this situation, the executable instructions may be "installed" on the system 600. Alternatively, machine-readable storage medium 620 may be a portable, external or remote storage medium, for example, that allows system 600 to download the instructions from the portable/external/remote storage medium. In this situation, the executable instructions may be part of an "installation package". As described herein, machine-readable storage medium 620 may be encoded with executable instructions to allow modification of non-volatile storage of a BMC.

Referring to FIG. 6, receive request instructions 622, when executed by a processor (e.g., 610), may cause processor 610 to receive, by a baseboard management controller (BMC), a request to modify non-volatile storage coupled to the BMC, wherein the request comprises a signature. Determine proper signature instructions 624, when executed, may cause processor 610 to determine, by the BMC, based on the received signature and a key for modifying the service OS, whether the request to modify the service OS is properly signed. Allow modification instructions 626, when executed, may cause processor 610 to, responsive to determining the request to modify the service OS is properly signed: allow modification of the service OS.

Figure 7:
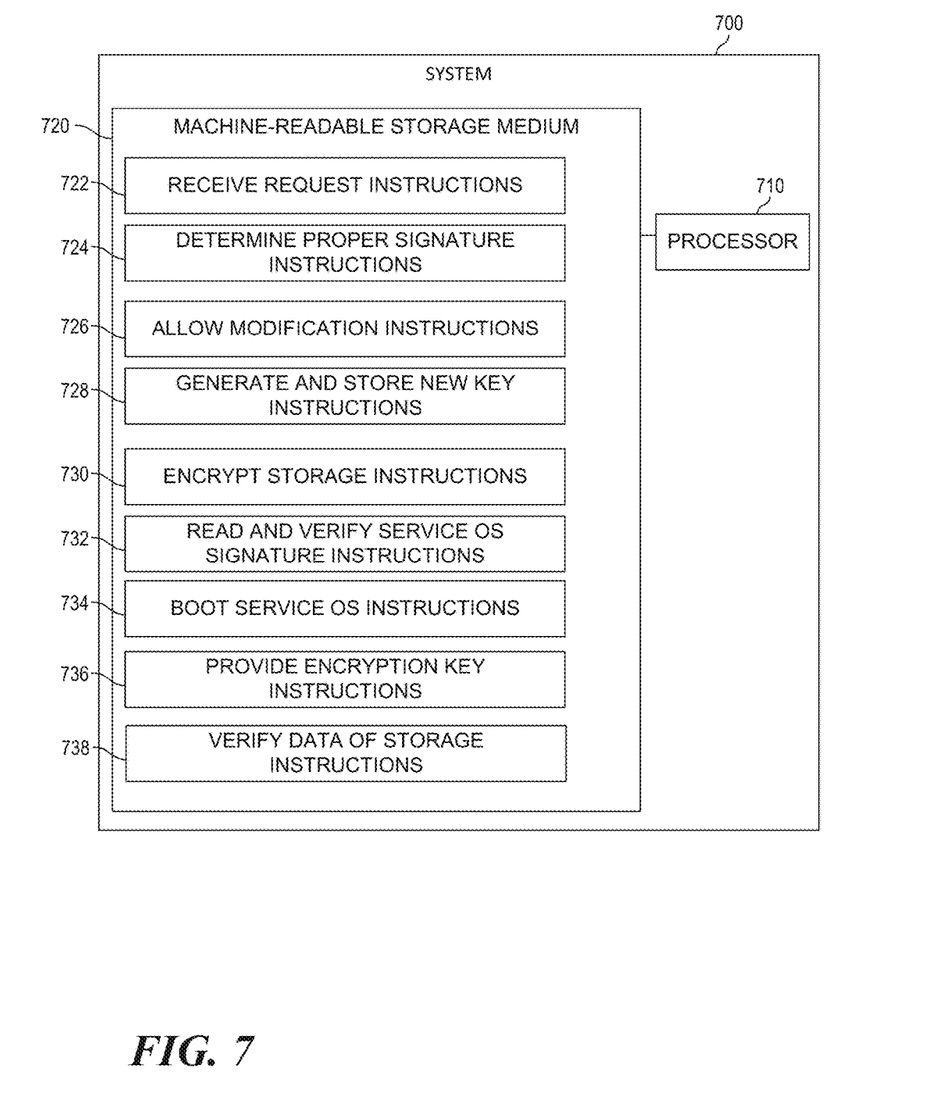
FIG. 7 is a block diagram of another example system for modifying a service OS of a baseboard management controller.

FIG. 7 is a block diagram of an example system for modifying a service OS of a baseboard management controller. System 700 may be similar to system 100 of FIG. 1, system 200 of FIG. 2, or system 300 of FIG. 3, for example. In the example of FIG. 7, system 700 includes a processor 710 and a machine-readable storage medium 720.

Storage medium 720 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 710 may be one or more central processing units (CPUs), microprocessors, and/or other hardware devices suitable for retrieval and execution of instructions stored in machine-readable storage medium 720. In the particular examples shown in FIG. 7, processor 710 may fetch, decode, and execute instructions 722, 724, 726, 728, 730, 732, 734, 736, 738 to modify non-volatile storage of a BMC. As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a storage drive, an optical disc, and the like. Machine-readable storage medium 720 may be disposed within system 700, as shown in FIG. 7. In this situation, the executable instructions may be "installed" on the system 700. Alternatively, machine-readable storage medium 720 may be a portable, external or remote storage medium, for example, that allows system 700 to download the instructions from the portable/external/remote storage medium. In this situation, the executable instructions may be part of an "installation package". As described herein, machine-readable storage medium 720 may be encoded with executable instructions to allow modification of non-volatile storage of a BMC.

Referring to FIG. 7, receive request instructions 722, when executed by a processor (e.g., 710), may cause processor 710 to receive, by a baseboard management controller (BMC), a request to modify a service OS stored on a non-volatile storage coupled to the BMC, wherein the request comprises a signature.

Determine proper signature instructions 724, when executed, may cause processor 710 to determine, by the BMC, based on the received signature and a key for modifying the service OS, whether the request to modify the service OS is properly signed. Allow modification instructions 726, when executed, may cause processor 710 to, responsive to determining the request to modify the service OS is properly signed: allow modification of the non-volatile storage.

Generate and store new key instructions 728, when executed, may cause processor 710 to generate, by the BMC, a new key for modifying the non-volatile flash memory; and store, by the BMC, the generated key. Encrypt storage instructions 730, when executed, may cause processor 710 to generate, by the BMC, a new key for modifying the service OS; and store, by the BMC, the generated key.

Read and verify instructions 732, when executed, may cause processor 710 to read, by the BMC, a signature of a service operating system (OS), wherein the service OS is stored in the non-volatile storage of the BMC and verify, by the BMC, whether the service OS is properly signed based on the signature and a key for the service OS.

Boot service OS instructions 734, when executed, may cause processor 710 to boot, by the BMC, the service OS responsive to determining that the service OS is properly signed. Provide encryption key instructions 736, when executed, may cause processor 710 to provide, by the BMC and to the service OS, an encryption key to verify data of the service OS, and verify data of storage instructions 738, when executed, may cause processor 710 to verify, by the service OS, data of the non-volatile storage accessed by the service OS.

The invention claimed is:

1. A method, comprising:
  receiving, by a baseboard management controller (BMC),
    a request to modify a service operating system (OS)

stored on non-volatile storage, wherein the non-volatile storage is coupled to the BMC, and wherein the request comprises a signature;

determining, by the BMC, based on the received signature and a key for modifying the non-volatile storage, whether the request to modify the service OS is properly signed;

responsive to determining the request to modify the service OS is properly signed: allowing modification of the service OS;

generating, by the BMC, a new key for modifying the service OS;

generating, by the BMC, a signature for the service OS based on the new key for modifying the non-volatile storage;

reading, by the BMC, the signature of the service OS; and determining, by the BMC, whether the service OS is properly signed based on the signature and the new key.

2. The method of claim 1, wherein receiving the request comprises receiving the request via at least one of: a serial interface or a network interface of the BMC, wherein the at least one serial interface or network interface is coupled to a computing device separate from a computing device comprising the BMC.

3. The method of claim 1, further comprising:
encrypting, by the BMC, the service OS based on the generated key.

4. The method of claim 1, further comprising:
booting, by the BMC, the service OS responsive to determining that the service OS is properly signed; and
providing, by the BMC and to the service OS, an encryption key to verify data of the service OS.

5. The method of claim 1, further comprising:
verifying, by the service OS, data of the non-volatile storage accessed by the service OS.

6. The method of claim 1, further comprising:
verifying, by the BMC, a signature of a bootloader of the BMC before reading the service OS from the non-volatile storage.

7. A device comprising a baseboard management controller (BMC) comprising:
non-volatile storage comprising a service operating system (OS) stored thereon; and
a processor to:
receive, by a baseboard management controller (BMC), a request to modify the service OS, wherein the request comprises a signature;
determine, by the BMC, based on the received signature and a key for modifying the service OS, whether the request to modify the service OS is properly signed;
responsive to determining the request to modify the service OS is properly signed: allow modification of the service OS;
boot the service OS responsive to determining that the service OS is properly signed;
provide an encryption key to the service OS; and
verify, by the service OS, data of the service OS based on the provided encryption key.

8. The device of claim 7, comprising:
at least one of: a network interface or a serial interface, wherein the at least one serial interface or network interface is coupled to a computing device separate from a computing device comprising the BMC;
wherein to receive the request, the processor to:
receive the request via the least one of the serial interface or network interface.

9. The device of claim 7, wherein the processor to:
generate a new key for modifying the service OS; and
store the generated key.

10. The device of claim 9, wherein the processor to:
encrypt the service OS based on the generated key.

11. The device of claim 7, the processor to:
generate a signature of the service OS based on the generated key;
read a signature of the service operating system (OS); and
determine whether the service OS is properly signed based on the signature and the generated key.

12. The device of claim 7, the processor to:
verify, by the BMC, a signature of a bootloader of the computing device before reading the service OS from the non-volatile storage.

13. A non-transitory computer-readable storage medium comprising instructions stored thereon that, when executed, cause a processor to:
receive, by a baseboard management controller (BMC), a request to modify a service operating system (OS), wherein the service OS is stored on non-volatile storage coupled to the BMC, wherein the request comprises a signature;
determine, by the BMC, based on the received signature and a key for modifying the service OS, whether the request to modify the service OS is properly signed;
responsive to determining the request to modify the service OS is properly signed: allow modification of the service OS
generate, by the BMC, a new key for modifying the service OS;
store, by the BMC, the generated key; and
encrypt, by the BMC, the non-volatile storage based on the generated key.

14. The non-transitory computer-readable storage medium of claim 13, comprising instructions stored thereon that, when executed, cause the processor to:
generate, by the BMC, a signature of the service OS based on the generated key;
read, by the BMC, a signature of the service OS; and
verify, by the BMC, whether the service OS is properly signed based on the signature and a key for the service OS.

15. The non-transitory computer-readable storage medium of claim 14, comprising instructions stored thereon that, when executed, cause the processor to:
boot, by the BMC, the service OS responsive to determining that the service OS is properly signed;
provide, by the BMC and to the service OS, an encryption key to verify data of the service OS; and
verify, by the service OS, data of the non-volatile storage accessed by the service OS.

* * * * *